US012225387B2

(12) United States Patent
Robertson et al.

(10) Patent No.: US 12,225,387 B2
(45) Date of Patent: Feb. 11, 2025

(54) COMMUNICATIONS DEVICE WITH CONCURRENT OPERATION IN 5GHZ AND 6GHZ U-NII FREQUENCY RANGES (71) Applicant: Murata Manufacturing Co., Ltd., Nagaokakyo (JP)

(72) Inventors: Scot Robertson, Santa Barbara, CA (US); Andrew Guyette, San Mateo, CA (US)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 470 days.

(21) Appl. No.: 17/549,777

(22) Filed: Dec. 13, 2021

(65) Prior Publication Data
US 2023/0094810 A1  Mar. 30, 2023

Related U.S. Application Data (60) Provisional application No. 63/249,572, filed on Sep. 29, 2021.

(51) Int. Cl.
*H04W 16/14* (2009.01)
*H04B 7/0413* (2017.01)
*H04W 72/0453* (2023.01)

(52) U.S. Cl.
CPC .......... *H04W 16/14* (2013.01); *H04B 7/0413* (2013.01); *H04W 72/0453* (2013.01)

(58) Field of Classification Search
CPC . H04W 16/14; H04W 72/0453; H04B 7/0413
See application file for complete search history.

(56) References Cited

U.S. PATENT DOCUMENTS

| | | | |
|---|---|---|---|
| 5,274,345 | A | 12/1993 | Gau |
| 5,446,330 | A | 8/1995 | Eda et al. |
| 5,552,655 | A | 9/1996 | Stokes et al. |
| 5,726,610 | A | 3/1998 | Allen et al. |
| 5,853,601 | A | 12/1998 | Krishaswamy |
| 6,377,140 | B1 | 4/2002 | Ehara et al. |
| 6,516,503 | B1 | 2/2003 | Ikada et al. |
| 6,540,827 | B1 | 4/2003 | Levy et al. |
| 6,570,470 | B2 | 5/2003 | Maehara et al. |

(Continued)

FOREIGN PATENT DOCUMENTS

| | | |
|---|---|---|
| WO | 2016017104 | 2/2016 |
| WO | 2018003273 | 1/2018 |

OTHER PUBLICATIONS

Tho Nguyen, New Rules for Unlicensed National Information Infrastructure (U-NII) Bands KDB 789033, KDB 644545., Oct. 22, 2014, Office of Engineering and Technology Laboratory Division FCC (Year: 2014).*

(Continued)

*Primary Examiner* — Yemane Mesfin
*Assistant Examiner* — Jia Hao Deng
(74) *Attorney, Agent, or Firm* — ArentFox Schiff LLP (57) ABSTRACT Communications devices are disclosed. A communications device includes an unlicensed national information infrastructure frequency range 1 (U-NII-1) to U-NII-2A transceiver coupled to a first antenna though a U-NII-1 to U-NII-2A coexistence filter, and a U-NII-2C to U-NII-8 transceiver coupled to a second antenna though a U-NII-2C to U-NII-8 coexistence filter.

15 Claims, 4 Drawing Sheets

(56) References Cited

U.S. PATENT DOCUMENTS

| | | |
|---|---|---|
| 6,707,229 B1 | 3/2004 | Martin |
| 6,710,514 B2 | 3/2004 | Ikada et al. |
| 6,833,774 B2 | 12/2004 | Abbott et al. |
| 7,345,400 B2 | 3/2008 | Nakao et al. |
| 7,463,118 B2 | 12/2008 | Jacobsen |
| 7,535,152 B2 | 5/2009 | Ogami et al. |
| 7,684,109 B2 | 3/2010 | Godshalk et al. |
| 7,728,483 B2 | 6/2010 | Tanaka |
| 7,868,519 B2 | 1/2011 | Umeda |
| 7,941,103 B2 | 5/2011 | Iwamoto et al. |
| 7,965,015 B2 | 6/2011 | Tai et al. |
| 8,278,802 B1 | 10/2012 | Lee et al. |
| 8,294,330 B1 | 10/2012 | Abbott et al. |
| 8,344,815 B2 | 1/2013 | Yamanaka et al. |
| 8,816,567 B2 | 8/2014 | Zuo et al. |
| 8,829,766 B2 | 9/2014 | Milyutin et al. |
| 8,932,686 B2 | 1/2015 | Hayakawa et al. |
| 9,093,979 B2 | 7/2015 | Wang |
| 9,112,134 B2 | 8/2015 | Takahashi |
| 9,130,145 B2 | 9/2015 | Martin et al. |
| 9,148,121 B2 | 9/2015 | Inoue |
| 9,219,466 B2 | 12/2015 | Meltaus et al. |
| 9,276,557 B1 | 3/2016 | Nordquist et al. |
| 9,369,105 B1 | 6/2016 | Li et al. |
| 9,425,765 B2 | 8/2016 | Rinaldi |
| 9,525,398 B1 | 12/2016 | Olsson |
| 9,640,750 B2 | 5/2017 | Nakanishi et al. |
| 9,748,923 B2 | 8/2017 | Kando et al. |
| 9,762,202 B2 | 9/2017 | Thalmayr et al. |
| 9,780,759 B2 | 10/2017 | Kimura et al. |
| 9,837,984 B2 | 12/2017 | Khlat et al. |
| 10,079,414 B2 | 9/2018 | Guyette et al. |
| 10,187,039 B2 | 1/2019 | Komatsu et al. |
| 10,200,013 B2 | 2/2019 | Bower et al. |
| 10,211,806 B2 | 2/2019 | Bhattacharjee |
| 10,284,176 B1 | 5/2019 | Solal |
| 10,491,192 B1 | 11/2019 | Plesski et al. |
| 10,601,392 B2 | 3/2020 | Plesski et al. |
| 10,637,438 B2 | 4/2020 | Garcia et al. |
| 10,644,674 B2 | 5/2020 | Takamine |
| 10,756,697 B2 | 8/2020 | Plesski et al. |
| 10,790,802 B2 | 9/2020 | Yantchev et al. |
| 10,797,675 B2 | 10/2020 | Plesski |
| 10,812,048 B2 | 10/2020 | Nosaka |
| 10,819,309 B1 | 10/2020 | Turner et al. |
| 10,826,462 B2 | 11/2020 | Plesski et al. |
| 10,868,510 B2 | 12/2020 | Yantchev et al. |
| 10,868,512 B2 | 12/2020 | Garcia et al. |
| 10,868,513 B2 | 12/2020 | Yantchev |
| 10,911,017 B2 | 2/2021 | Plesski |
| 10,911,021 B2 | 2/2021 | Turner et al. |
| 10,911,023 B2 | 2/2021 | Turner |
| 10,917,070 B2 | 2/2021 | Plesski et al. |
| 10,917,072 B2 | 2/2021 | McHugh et al. |
| 10,985,726 B2 | 4/2021 | Plesski |
| 10,985,728 B2 | 4/2021 | Plesski et al. |
| 10,985,730 B2 | 4/2021 | Garcia |
| 10,992,282 B1 | 4/2021 | Plesski et al. |
| 10,992,283 B2 | 4/2021 | Plesski et al. |
| 10,992,284 B2 | 4/2021 | Yantchev |
| 10,998,877 B2 | 5/2021 | Turner et al. |
| 10,998,882 B2 | 5/2021 | Yantchev et al. |
| 11,003,971 B2 | 5/2021 | Plesski et al. |
| 11,114,996 B2 | 9/2021 | Plesski et al. |
| 11,114,998 B2 | 9/2021 | Garcia et al. |
| 11,139,794 B2 | 10/2021 | Plesski et al. |
| 11,143,561 B2 | 10/2021 | Plesski |
| 11,146,231 B2 | 10/2021 | Plesski |
| 11,146,232 B2 | 10/2021 | Yandrapalli et al. |
| 11,146,238 B2 | 10/2021 | Hammond et al. |
| 11,146,244 B2 | 10/2021 | Yantchev |
| 11,159,207 B2 * | 10/2021 | Seok ............... H04L 5/001 |
| 11,165,407 B2 | 11/2021 | Yantchev |
| 11,171,629 B2 | 11/2021 | Turner |
| 11,356,127 B2 * | 6/2022 | Hasnain ............. H04B 1/44 |
| 2002/0079986 A1 | 6/2002 | Ruby et al. |
| 2002/0130736 A1 | 9/2002 | Mukai |
| 2002/0158714 A1 | 10/2002 | Kaitila et al. |
| 2002/0189062 A1 | 12/2002 | Lin et al. |
| 2003/0080831 A1 | 5/2003 | Segovia Fernandez et al. |
| 2003/0199105 A1 | 10/2003 | Kub et al. |
| 2004/0041496 A1 | 3/2004 | Imai et al. |
| 2004/0100164 A1 | 5/2004 | Murata |
| 2004/0261250 A1 | 12/2004 | Kadota et al. |
| 2005/0185026 A1 | 8/2005 | Noguchi et al. |
| 2005/0218488 A1 | 10/2005 | Matsuo |
| 2005/0264136 A1 | 12/2005 | Tsutsumi et al. |
| 2006/0152107 A1 | 7/2006 | Tanaka |
| 2006/0179642 A1 | 8/2006 | Kawamura |
| 2007/0182510 A1 | 8/2007 | Park |
| 2007/0188047 A1 | 8/2007 | Tanaka |
| 2007/0194863 A1 | 8/2007 | Shibata et al. |
| 2007/0267942 A1 | 11/2007 | Matsumoto et al. |
| 2008/0246559 A1 | 10/2008 | Ayazi |
| 2010/0019866 A1 | 1/2010 | Hara et al. |
| 2010/0064492 A1 | 3/2010 | Tanaka |
| 2010/0123367 A1 | 5/2010 | Tai et al. |
| 2011/0018389 A1 | 1/2011 | Fukano et al. |
| 2011/0018654 A1 | 1/2011 | Bradley et al. |
| 2011/0109196 A1 | 5/2011 | Goto et al. |
| 2011/0278993 A1 | 11/2011 | Iwamoto |
| 2012/0286900 A1 | 11/2012 | Kadota et al. |
| 2012/0326809 A1 | 12/2012 | Tsuda |
| 2013/0127551 A1 | 5/2013 | Yamanaka |
| 2013/0234805 A1 | 9/2013 | Takahashi |
| 2013/0271238 A1 | 10/2013 | Onda |
| 2013/0278609 A1 | 10/2013 | Stephanou et al. |
| 2013/0321100 A1 | 12/2013 | Wang |
| 2014/0130319 A1 | 5/2014 | Iwamoto |
| 2014/0145556 A1 | 5/2014 | Kadota |
| 2014/0151151 A1 | 6/2014 | Reinhardt |
| 2014/0152145 A1 | 6/2014 | Kando et al. |
| 2014/0173862 A1 | 6/2014 | Kando et al. |
| 2014/0225684 A1 | 8/2014 | Kando et al. |
| 2015/0042417 A1 | 2/2015 | Onodera et al. |
| 2015/0165479 A1 | 6/2015 | Lasiter et al. |
| 2015/0319537 A1 | 11/2015 | Perois et al. |
| 2015/0333730 A1 | 11/2015 | Meltaus et al. |
| 2015/0365067 A1 | 12/2015 | Hori et al. |
| 2016/0028367 A1 | 1/2016 | Shealy |
| 2016/0087187 A1 | 3/2016 | Burak |
| 2016/0182009 A1 | 6/2016 | Bhattacharjee |
| 2017/0063332 A1 | 3/2017 | Gilbert et al. |
| 2017/0179225 A1 | 6/2017 | Kishimoto |
| 2017/0179928 A1 | 6/2017 | Raihn et al. |
| 2017/0214381 A1 | 7/2017 | Bhattacharjee |
| 2017/0214387 A1 | 7/2017 | Burak et al. |
| 2017/0222617 A1 | 8/2017 | Mizoguchi |
| 2017/0222622 A1 | 8/2017 | Solal et al. |
| 2017/0370791 A1 | 12/2017 | Nakamura et al. |
| 2018/0005950 A1 | 1/2018 | Watanabe |
| 2018/0026603 A1 | 1/2018 | Iwamoto |
| 2018/0033952 A1 | 2/2018 | Yamamoto |
| 2018/0041191 A1 | 2/2018 | Park |
| 2018/0062615 A1 | 3/2018 | Kato et al. |
| 2018/0062617 A1 | 3/2018 | Yun et al. |
| 2018/0123016 A1 | 5/2018 | Gong |
| 2018/0191322 A1 | 7/2018 | Chang et al. |
| 2018/0278227 A1 | 9/2018 | Hurwitz |
| 2019/0068164 A1 | 2/2019 | Houlden et al. |
| 2019/0123721 A1 | 4/2019 | Takamine |
| 2019/0131953 A1 | 5/2019 | Gong |
| 2019/0273480 A1 | 9/2019 | Lin et al. |
| 2019/0348966 A1 | 11/2019 | Campanella-Pineda |
| 2019/0379351 A1 | 12/2019 | Miyamoto et al. |
| 2019/0386635 A1 | 12/2019 | Plesski et al. |
| 2019/0386636 A1 | 12/2019 | Plesski et al. |
| 2020/0007110 A1 | 1/2020 | Konaka et al. |
| 2020/0021272 A1 | 1/2020 | Segovia Fernandez et al. |
| 2020/0036357 A1 | 1/2020 | Mimura |
| 2020/0235719 A1 | 7/2020 | Yantchev et al. |
| 2020/0259480 A1 | 8/2020 | Pensala |
| 2020/0313645 A1 | 10/2020 | Caron |

(56) References Cited

U.S. PATENT DOCUMENTS

| | | |
|---|---|---|
| 2020/0350891 A1 | 11/2020 | Turner |
| 2021/0013859 A1 | 1/2021 | Turner et al. |
| 2021/0328574 A1 | 10/2021 | Garcia |

OTHER PUBLICATIONS

A. C. Guyette, "Theory and Design of Intrinsically Switched Multiplexers With Optimum Phase Linearity," in IEEE Transactions on Microwave Theory and Techniques, vol. 61, No. 9, pp. 3254-3264, Sep. 2013, doi: 10.1109/TMTT.2013.2274963. Sep. 2013.

Acoustic Properties of Solids ONDA Corporation 592 Weddell Drive, Sunnyvale, CA 94089, Apr. 11, 2003, pp. 5 (Year 2003). 2003.

Bahreyni, B. Fabrication and Design of Resonant Microdevices Andrew William, Inc. 2018, NY (Year 2008). 2008.

Buchanan "Ceramic Materials for Electronics" 3rd Edition, first published in 2004 by Marcel Dekker, Inc. pp. 496 (Year 2004). 00 Jan. 2004.

Ekeom, D. & Dubus, Bertrand & Volatier, A . . . (2006). Solidly mounted resonator (SMR) FEM-BEM simulation. 1474-1477. 10.1109/ULTSYM.2006.371.

G. Manohar, "Investigation of Various Surface Acoustic Wave Design Configurations for Improved Sensitivity." Doctoral dissertation, University of South Florida, USA, Jan. 2012, 7 pages.

Kadota et al. "5.4 Ghz Lamb Wave Resonator on LiNbO3 Thin Crystal Plate and Its Application," published in Japanese Journal of Applied Physics 50 (2011) 07HD11. (Year: 2011) 2011.

M. Kadota, S. Tanaka, "Wideband acoustic wave resonators composed of hetero acoustic layer structure," Japanese Journal of Applied Physics, vol. 57, No. 7S1. Published Jun. 5, 2018. 5 pages.

Material Properties of Tibtech Innovations, © 2018 Tibtech Innovations (Year 2018). 2018.

Merriam Webster, dictionary meaning of the word "diaphragm", since 1828, Merriam Webster (Year: 1828) 1828.

Mizutaui, K. and Toda, K., "Analysis of lamb wave propagation characteristics in rotated Ycut Xpropagation LiNbO3 plates." Electron. Comm. Jpn. Pt. 1, 69, No. 4 (1986): 47-55. doi:10.1002/ecja.4410690406.

Moussa et al. Review on Triggered Liposomal Drug Delivery with a Focus on Ultrasound 2015, Bentham Science Publishers, pp. 16 (Year 2005) 2005.

Namdeo et al. "Simulation on Effects of Electrical Loading due to Interdigital Transducers in Surface Acoustic Wave Resonator", published in Procedia Engineering 64 (2013) of Science Direct pp. 322-330 (Year: 2013) 2013.

Naumenko et al., "Optimal orientations of Lithium Niobate for resonator SAW filters", 2003 IEEE Ultrasonics Symposium—pp. 2110-2113. (Year: 2003).

R. Olsson III, K. Hattar et al. "A high electromechanical coupling coefficient SH0 Lamb wave lithiumniobate micromechanical resonator and a method for fabrication" Sensors and Actuators A: Physical, vol. 209, Mar. 1, 2014, pp. 183-190.

Rodriguez-Madrid et al., "Super-High-Frequency SAW Resonators on AlN/Diamond", IEEE Electron Device Letters, vol. 33, No. 4, Apr. 2012, pp. 495-497. Year: 2012) 2012.

Safari et al. "Piezoelectric for Transducer Applications" published by Elsevier Science Ltd., pp. 4 (Year: 2000). 2020.

Santosh, G. , Surface acoustic wave devices on silicon using patterned and thin film ZnO, Ph.D. thesis, Feb. 2016, Indian Institute of technology Guwahati, Assam, India Feb. 2016.

Sorokin et al. Study of Microwave Acoustic Attenuation in a Multi-frequency Bulk Acoustic Resonator Based on a Synthetic Diamond Single Crystal Published in Acoustical Physics, vol. 61, No. 6, 2015 pp. 675 (Year 2015) 00 Jan. 2015.

T. Takai, H. Iwamoto, et al., "I.H.P.Saw Technology and its Application to Microacoustic Components (Invited)." 2017 EEE International Ultrasonics Symposium, Sep. 6-9, 2017. pp. 1-8.

USPTO/ISA, International Search Report and Written Opinion for PCT Application No. PCT/US2019/036433 dated Aug. 29, 2019.

USPTO/ISA, International Search Report and Written Opinion for PCT Application No. PCT/US2019/058632 dated Jan. 17, 2020.

USPTO/ISA, International Search Report and Written Opinion for PCT Application No. PCT/US2020/45654 dated Oct. 29, 2020.

USPTO/ISA, International Search Report and Written Opinion for PCT Application No. PCT/US2021/024824 dated Jul. 27, 2021, 9 total pages.

USPTO/ISA, International Search Report and Written Opinion for PCT Application No. PCT/US2021/048505 dated Dec. 1, 2021, 11 total pages.

Y. Yang, A. Gao et al. "5 GHZ Lithium Niobate MEMS Resonators With High FOM of 153", 2017 IEEE 30th International Conference in Micro Electro Mechanical Systems (MEMS). Jan. 22-26, 2017. pp. 942-945.

Y. Yang, R. Lu et al. "Towards Ka Band Acoustics: Lithium Niobat Asymmetrical Mode Piezoelectric MEMS Resonators", Department of Electrical and Computer Engineering University of Illinois at Urbana-Champaign, May 2018. pp. 1-2.

Yanson Yang, Ruochen Lu, Songbin Gong, High Q Antisymmetric Mode Lithium Niobate MEMS Resonators With Spurious Mitigation, Journal of Microelectromechanical Systems, vol. 29, No. 2, Apr. 2020. Apr. 2, 2020.

Yu-Po Wong, Luyan Qiu, Naoto Matsuoka, Ken-ya Hashimoto, Broadband Piston Mode Operation for First-order Antisymmetric Mode Resonators, 2020 IEEE International Ultrasonics Symposium, Sep. 2020. Sep. 2020.

Zou, Jie "High-Performance Aluminum Nitride Lamb Wave Resonators for RF Front-End Technology" University of California, Berkeley, Summer 2015, pp. 63 (Year 2015) 00 Jan. 2015.

\* cited by examiner

COMMUNICATIONS DEVICE WITH CONCURRENT OPERATION IN 5GHZ AND 6GHZ U-NII FREQUENCY RANGES

RELATED APPLICATION INFORMATION

This patent claims priority from provisional patent application 63/249,572, filed Sep. 29, 2021, entitled RECEIVER WITH U-NII-2C THRU U-NII-8 BAND PASS FILTER.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to radio frequency filters using acoustic wave resonators, and specifically to filters for use in communications equipment.

Description of the Related Art

A radio frequency (RF) filter is a two-port device configured to pass some frequencies and to stop other frequencies, where "pass" means transmit with relatively low signal loss and "stop" means block or substantially attenuate. The range of frequencies passed by a filter is referred to as the "pass-band" of the filter. The range of frequencies stopped by such a filter is referred to as the "stop-band" of the filter. A typical RF filter has at least one pass-band and at least one stop-band. Specific requirements on a passband or stop-band depend on the specific application. For example, a "pass-band" may be defined as a frequency range where the insertion loss of a filter is better than a defined value such as 1 dB, 2 dB, or 3 dB. A "stop-band" may be defined as a frequency range where the rejection of a filter is greater than a defined value such as 20 dB, 30 dB, 40 dB, or greater depending on application.

RF filters are used in communications systems where information is transmitted over wireless links. For example, RF filters may be found in the RF front-ends of cellular base stations, mobile telephone and computing devices, satellite transceivers and ground stations, IoT (Internet of Things) devices, laptop computers and tablets, fixed point radio links, and other communications systems. RF filters are also used in radar and electronic and information warfare systems.

RF filters typically require many design trade-offs to achieve, for each specific application, the best compromise between performance parameters such as insertion loss, rejection, isolation, power handling, linearity, size and cost. Specific design and manufacturing methods and enhancements can benefit simultaneously one or several of these requirements.

Performance enhancements to the RF filters in a wireless system can have broad impact to system performance. Improvements in RF filters can be leveraged to provide system performance improvements such as larger cell size, longer battery life, higher data rates, greater network capacity, lower cost, enhanced security, higher reliability, etc. These improvements can be realized at many levels of the wireless system both separately and in combination, for example at the RF module, RF transceiver, mobile or fixed sub-system, or network levels.

High performance RF filters for present communication systems commonly incorporate acoustic wave resonators including surface acoustic wave (SAW) resonators, bulk acoustic wave (BAW) resonators, film bulk acoustic wave resonators (FBAR), and other types of acoustic resonators. However, these existing technologies are not well-suited for use at the higher frequencies and bandwidths proposed for future communications networks.

The desire for wider communication channel bandwidths will inevitably lead to the use of higher frequency communications bands. Radio access technology for mobile telephone networks has been standardized by the 3GPP ($3^{rd}$ Generation Partnership Project). Radio access technology for $5^{th}$ generation mobile networks is defined in the 5G NR (new radio) standard. The 5G NR standard defines several new communications bands. Two of these new communications bands are n77, which uses the frequency range from 3300 MHz to 4200 MHz, and n79, which uses the frequency range from 4400 MHz to 5000 MHz. Both band n77 and band n79 use time-division duplexing (TDD), such that a communications device operating in band n77 and/or band n79 use the same frequencies for both uplink and downlink transmissions. Bandpass filters for bands n77 and n79 must be capable of handling the transmit power of the communications device.

The Unlicensed National Information Infrastructure (U-NII) band, as defined by the United States Federal Communications Commission, is the portion of the radio frequency spectrum from 5.15 GHz to 7.125 GHz. The U-NII band is used by wireless local area networks (WLANs) and by many wireless Internet service providers. U-NII consists of eight ranges. Portions of U-NII-1 through U-NII-4 are used for 5 GHz WLANs based on the Institute of Electrical and Electronic Engineers (IEEE) Standard 802.11a and newer standards (commonly referred to as 5 GHz Wi-Fi®). U-NII-5 though U-NII-8 are allocated for 6 GHz WLANs based on the Institute of Electrical and Electronic Engineers (IEEE) Standard 802.11ax (commonly referred to a 6 GHz Wi-Fi). The U-NII frequency ranges also require high frequency and wide bandwidth bandpass filters.

The Transversely-Excited Film Bulk Acoustic Resonator (XBAR) is an acoustic resonator structure for use in microwave filters. The XBAR is described in U.S. Pat. No. 10,491,291, titled TRANSVERSELY EXCITED FILM BULK ACOUSTIC RESONATOR. An XBAR resonator comprises an interdigital transducer (IDT) formed on a thin floating layer, or diaphragm, of a single-crystal piezoelectric material. The IDT includes a first set of parallel fingers, extending from a first busbar and a second set of parallel fingers extending from a second busbar. The first and second sets of parallel fingers are interleaved. A microwave signal applied to the IDT excites a shear primary acoustic wave in the piezoelectric diaphragm. XBAR resonators provide very high electromechanical coupling and high frequency capability. XBAR resonators may be used in a variety of RF filters including band-reject filters, band-pass filters, duplexers, and multiplexers. XBARs are well suited for use in filters for communications bands with frequencies above 3 GHz.

Throughout this description, elements appearing in figures are assigned three-digit or four-digit reference designators, where the two least significant digits are specific to the element and the one or two most significant digit is the figure number where the element is first introduced. An element that is not described in conjunction with a figure may be presumed to have the same characteristics and function as a previously-described element having the same reference designator.

DETAILED DESCRIPTION

Description of Apparatus

Figure 1:
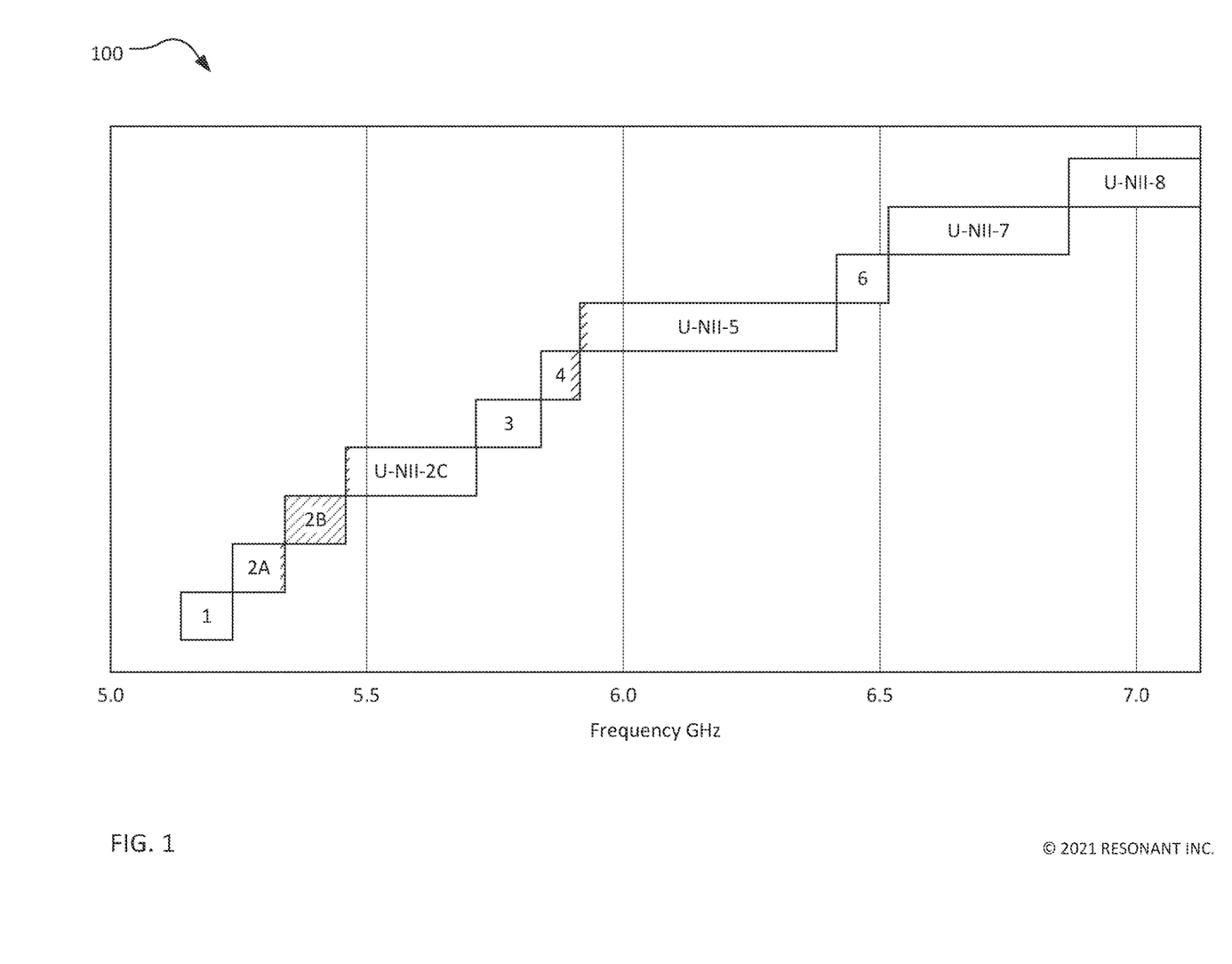
FIG. 1 is a diagram showing the defined U-NII frequency ranges.

FIG. 1 is a chart depicting the U-NII frequency spectrum, which is divided into 8 frequency ranges designated U-NII-1 through U-NII-8. U-NII-2 is divided into three portions, or sub-ranges, designated U-NII-2A, U-NII-2B, and U-NII-2C. Almost all of the U-NII frequency spectrum is allocated for WLANs (and other applications) with the exception of U-NII-2B and a small frequency band around 5.925 GHz (the upper edge of U-NII-4 and the lower edge of U-NII-5). The unallocated portions of the U-NII spectrum are cross-hatched in FIG. 1.

It is desirable for a communications device to be able to concurrently use more than one portion of the U-NII spectrum. However, concurrent use, or coexistence of two or more portions of the spectrum requires a corresponding number of filters to distinguish between the portions. Each filter would be required to pass a respective portion of the spectrum while blocking the other portions. Such filters are called "coexistence filters" in this patent.

Realizable RF filters transition between pass-bands and stop-bands over a finite frequency range. The unallocated frequency range between U-NII-4 and U-NII-5 is, at most, 50 MHz, which is much smaller than the transition frequency range for coexistence filters having an acceptable size and cost for a portable communications device. Unallocated frequency range U-NII-2B covers 120 MHz. Additionally, the upper 10 MHz of range U-NII-2A and the lowest 10 MHz of U-NII-2C are not used by WLAN channels defined by IEEE Standard 802.11. The total unused spectrum of 140 MHz is sufficient for coexistence filters to allow concurrent operation of WLANs in the U-NII-1/U-NII-2A spectrum and WLANs in the U-NII-2C to U-NII-8 spectrum.

Figure 2:
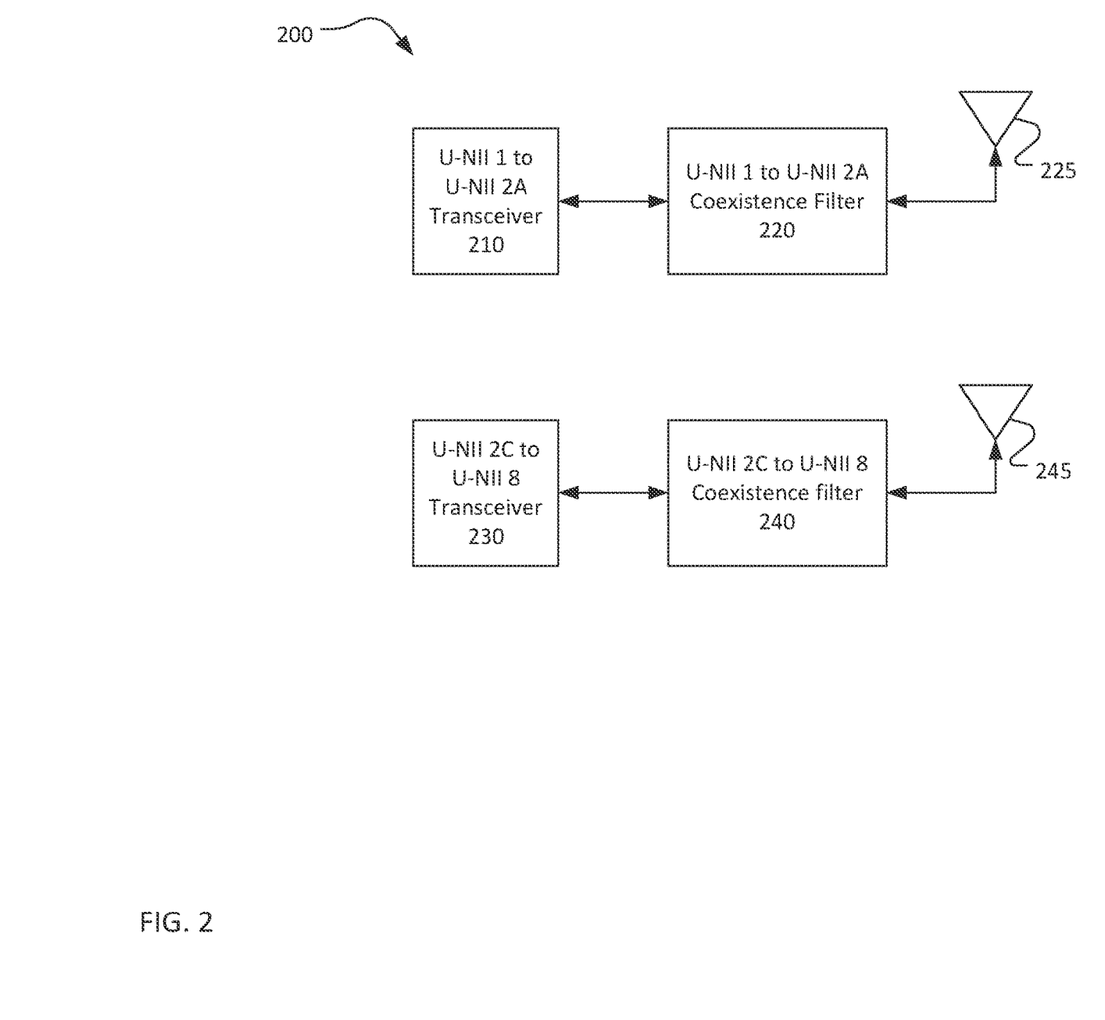
FIG. 2 is a block diagram of portions of a communication device with concurrent operation in 5 GHz and 6 GHz U-NII frequency ranges.

FIG. 2 is a block diagram of portions of a communications device 200 capable of concurrent communications in two portions of the U-NII spectrum. Specifically, the communications device 200 can communicate in the U-NII-1 to U-NII-2A spectrum and concurrently communicate in the U-NII-2C to U-NII-8 spectrum.

The communications device 200 includes a U-NII-1 to U-NII-2A transceiver (transmitter/receiver) 210 coupled to an antenna 225 via a U-NII-1 to U-NII-2A coexistence filter 220. The U-NII-1 to U-NII-2A transceiver 210 includes a transmitter, a receiver, and a transmit/receive switch to select which of the transmitter and receiver is connected to the coexistence filter 220 at any given time. The U-NII-1 to U-NII-2A transceiver 210 typically also includes one or more digital processors performing processing functions such as digital signal processing and media access control functions. The U-NII-1 to U-NII-2A coexistence filter 220 is configured to pass (i.e. transmit with acceptably low loss) the U-NII-1 to U-NII-2A frequency spectrum and stop (i.e., adequately attenuate) the U-NII-2C to U-NII-8 frequency spectrum.

The communications device 200 also includes a U-NII-2C to U-NII-8 transceiver (transmitter/receiver) 230 coupled to an antenna 245 via a U-NII-2C to U-NII-8 coexistence filter 240. The U-NII-2C to U-NII-8 transceiver 230 includes a transmitter, a receiver, and a transmit/receive switch to select which of the transmitter and receiver is connected to the coexistence filter 240 at any given time. The U-NII-2C to U-NII-8 transceiver 230 typically also includes one or more digital processors performing processing functions such as digital signal processing and media access control functions. The U-NII-2C to U-NII-8 coexistence filter 240 is configured to pass (i.e. transmit with acceptably low loss) the U-NII-2C to U-NII-8 frequency spectrum and stop (i.e., adequately attenuate) the U-NII-1 to U-NII-2A frequency spectrum.

In some applications the antennas 225, 245 may be a common antenna, in which case the coexistence filters 220, 240 perform the function of a diplexer. In some applications, processing functions required by the transceivers 210, 230 may be performed by a common processor.

Figure 3:
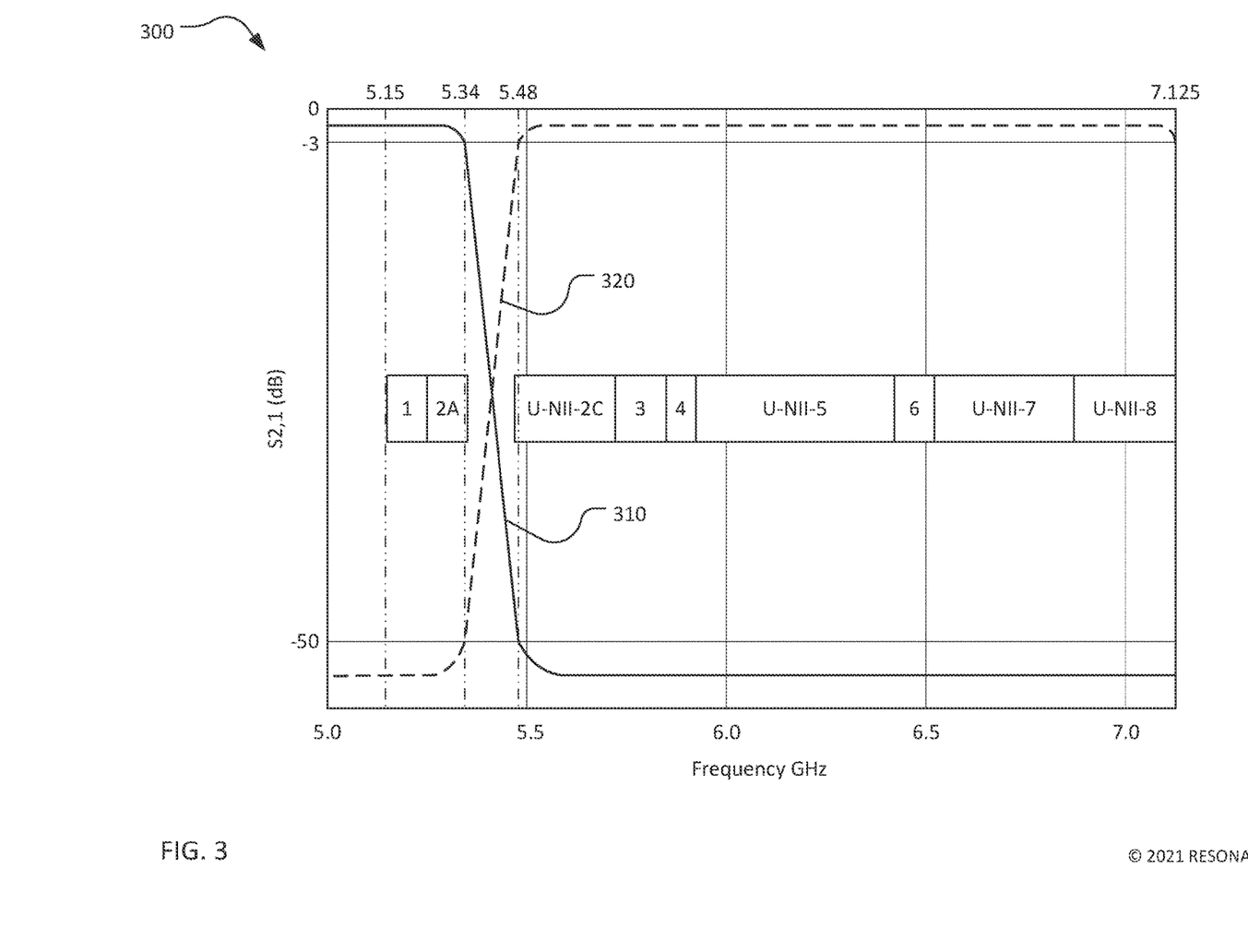
FIG. 3 is a graph of the input-output transfer function S2,1 of exemplary coexistence bandpass filters for the radio of FIG. 2.

FIG. 3 is a chart 300 of idealized characteristics of exemplary coexistence filters for the communications device 200 of FIG. 2. The U-NII-1 to U-NII-8 frequency ranges are identified for reference.

The solid curve 310 is a plot of idealized characteristics of a U-NII-1 to U-NII-2A coexistence filter. The U-NII-1 to U-NII-2A coexistence filter has a pass-band from less than 5.15 GHz to 5.34 GHz and a stop-band from 5.48 GHz to greater than 7.125 GHz. In this example, the input/output transfer function (S2,1) of the filters is required to be greater than −3 dB in the pass-band and less than −50 dB in the stop-band. These requirements are exemplary and specific applications may have other requirements.

The dashed curve 320 is a plot of idealized characteristics of a U-NII-2C to U-NII-8 coexistence filter. The U-NII-2C to U-NII-8 coexistence filter has a pass-band from 5.48 GHz to at least 7.125 GHz and a stop-band from 5.34 GHz to less than 5.15 GHz. In this example, the input/output transfer function (S2,1) of the filters is required to be greater than −3 dB in the pass-band and less than −50 dB in the stop-band. These requirements are exemplary and specific applications may have other requirements.

The width of the pass-band of the U-NII-2C to U-NII-8 coexistence filter is 1645 MHz, which is 26% of its center frequency of 6300 MHz. A bandpass filter with 26% fractional bandwidth may be implemented using transversely-excited film bulk acoustic resonators (XBARs). For example, co-pending patent application Ser. No. 17/189,246, titled SPLIT-LADDER BAND N77 FILTER USING TRANSVERSELY-EXCITED FILM BULK ACOUSTIC RESONATORS, describes an XBAR bandpass filter with 24% fractional bandwidth for 5G NR band n77. A similar filter may be shifted in frequency and optimized for the U-NII-2C to U-NII-8 coexistence filter.

Portable communications devices are increasingly using multiple-input multiple-output (MIMO) radio architectures to increase communications bandwidth. MIMO radios use multiple receive channels and/or multiple transmit channels within a common frequency band. MIMO radios are commonly described as M×N, where M is the number of receive channels and N is the number of transmit channels. For example, the communications device of FIG. 2 could be described as two 1×1 MIMO radios since there is only a single transmit channel and a single receive channel in each frequency range. MIMO radio architectures currently in use include 2×2 (two receive and two transmit channels), 4×2 (four receive and two transmit channels) and 4×4 (four receive and four transmit channels).

Figure 4:
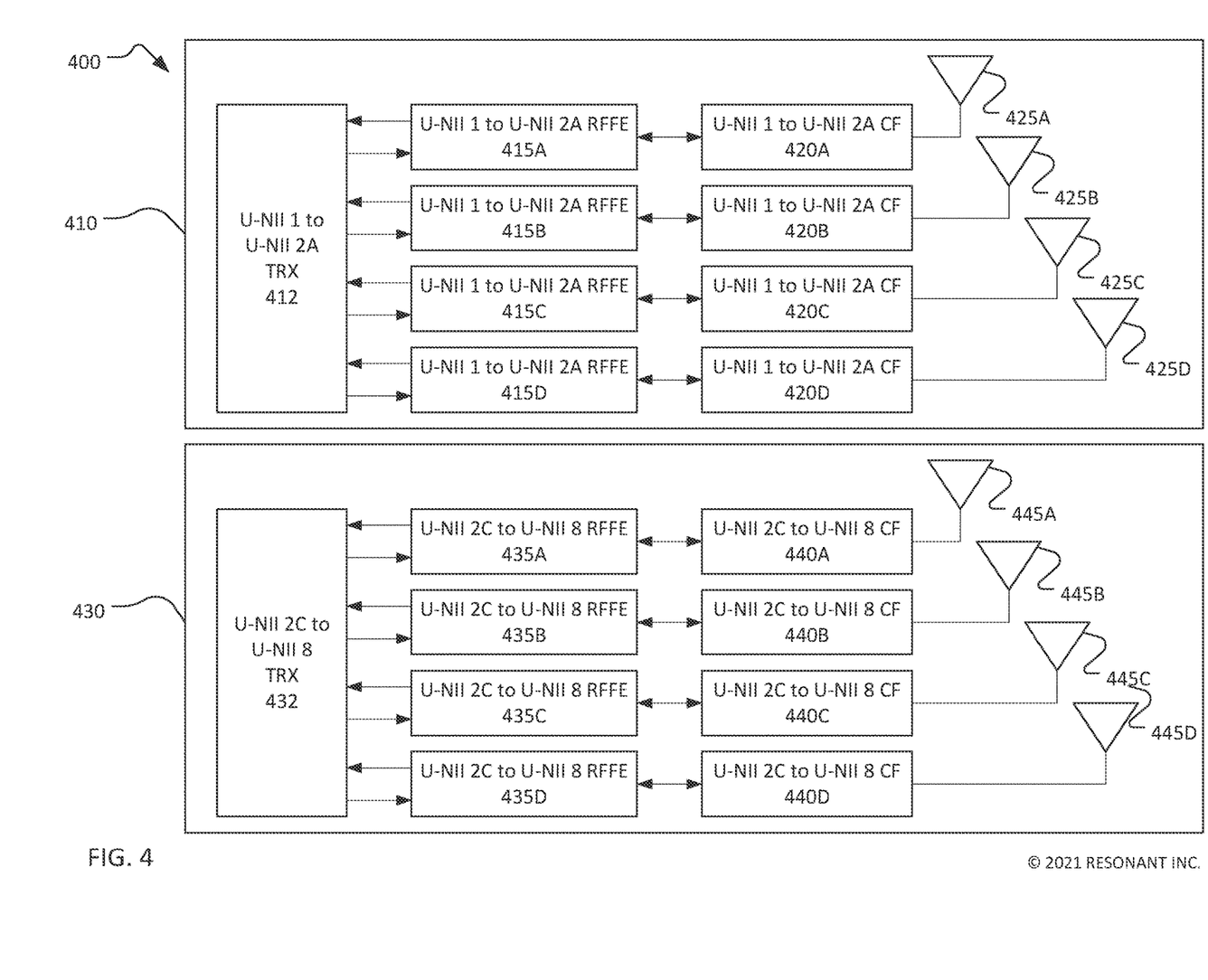
FIG. 4 is a block diagram of another communications device with concurrent operation in 5 GHz and 6 GHz U-NII frequency ranges.

FIG. 4 is a block diagram of portions of another communications device 400 capable of concurrent communications in two portions of the U-NII spectrum. Specifically, the communications device 400 includes a 4×4 MIMO radio 410 for communications in the U-NII-1 to U-NII-2A spectrum and a 4×4 MIMO radio 430 for concurrent communications in the U-NII-2C to U-NII-8 spectrum.

The U-NII-1 to U-NII-2A radio 410 includes a U-NII-1 to U-NII-2A transmit/receive (TRX) processor 412 and four channels. Each channel includes a respective U-NII-1 to U-NII-2A RF front end (RFFE) 415A, 415B, 415C, 415D coupled to a respective antenna 425A, 425B, 425C, 425D via a respective U-NII-1 to U-NII-2A coexistence filter (CF) 420A, 420B, 420C, 420D. The U-NII-1 to U-NII-2A transmit/receive (TRX) processor 412 may include, for example, various processors and processing functions such as one or more digital signal processors and a processor performing a media access control (MAC) function. Each U-NII-1 to U-NII-2A RF front end (RFFE) 415A, 415B, 415C, 415D may include a power amplifier, a low noise amplifier, a transmit/receive switch, and D/A and A/D converters.

The U-NII-2C to U-NII-8 radio 430 includes a U-NII-2C to U-NII-8 TRX processor 432 and four channels. Each channel includes a respective U-NII-2C to U-NII-8 RF front end 435A, 435B, 435C, 435D coupled to a respective antenna 445A, 445B, 445C, 445D via a respective U-NII-2C to U-NII-8 coexistence filter 440A, 440B, 440C, 440D. The U-NII-2C to U-NII-8 transmit/receive (TRX) processor 432 may include, for example, various processors and processing functions such as one or more digital signal processors and a processor performing a media access control (MAC) function. Each U-NII-2C to U-NII-8 RF front end 435A, 435B, 435C, 435D may include a power amplifier, a low noise amplifier, a transmit/receive switch, and D/A and A/D converters.

In some applications some or all of the antennas 425A-D, 445A-D may be common to both the U-NII-1 to U-NII-2A and U-NII-2C to U-NII-8 transceivers, in which case the respective coexistence filters 420A-D, 440A-D act as diplexers. In some applications, processing functions required by the transceivers 410, 430 may be performed, at least in part, by one or more common processors. In radio configurations, such as 4×2 MIMO, where some channels are only used for reception, the corresponding RFFE will not include a power amplifier or A/D converter.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A communications device, comprising:
    an unlicensed national information infrastructure frequency range 1 (U-NII-1) to U-NII-2A transceiver coupled to a first antenna through a U-NII-1 to U-NII-2A coexistence filter; and
    a U-NII-2C to U-NII-8 transceiver coupled to a second antenna through a U-NII-2C to U-NII-8 coexistence filter,
    wherein a subrange of U-NII-2B defines an unused frequency spectrum of the communication device between the subrange U-NII-2A and the subrange U-NII-2C such that the respective coexistence filters are configured for concurrently filtering signals in the U-NII-1/U-NII-2A spectrum and the U-NII-2C to U-NII-8 spectrum.

2. The communications device of claim 1, wherein
    the U-NII-1 to U-NII-2A transceiver operates over a frequency range of 5.15 GHz to 5.34 GHz, and
    U-NII-2C to U-NII-8 transceiver operates over a frequency range of 5.48 GHz to 7.125 GHz.

3. The communications device of claim 1, wherein the U-NII-1 to U-NII-2A coexistence filter has a pass-band from 5.15 GHz to 5.34 GHZ, and a stop-band from 5.48 GHz to 7.125 GHz.

4. The communications device of claim 3, wherein an input-output transfer function of the U-NII-1 to U-NII-2A coexistence filter is greater than or equal to −3 dB over a frequency range of 5.15 GHz to 5.34 GHZ, and less than or equal to −50 dB over a frequency range of 5.48 GHz to 7.125 GHz.

5. The communications device of claim 1, wherein the U-NII-2C to U-NII-8 coexistence filter has a pass-band from 5.48 GHz to 7.125 GHZ, and a stop-band from 5.15 GHz to 5.34 GHz.

6. The communications device of claim 5, wherein an input-output transfer function of the U-NII-2C to U-NII-8 coexistence filter is greater than or equal to −3 dB over a frequency range of 5.48 GHz to 7.125 GHZ, and less than or equal to −50 dB over a frequency range of 5.15 GHz to 5.34 GHz.

7. The communications device of claim 1, wherein the U-NII-2C to U-NII-8 coexistence filter comprises a plurality of transversely-excited film bulk acoustic resonators (XBARs).

8. The communication device of claim 1, wherein the first antenna and the second antenna are the same.

9. A communications device, comprising:
an unlicensed national information infrastructure frequency range 1 (U-NII-1) to U-NII-2A multiple input, multiple output (MIMO) radio comprising one to four channels, each channel comprising a respective radio frequency front end (RFFE) coupled to a respective antenna through a respective U-NII-1 to U-NII-2A coexistence filter; and
a U-NII-2C to U-NII-8 MIMO radio comprising one to four channels, each channel comprising a respective radio frequency front end (RFFE) coupled to a respective antenna through a respective U-NII-2C to U-NII-8 coexistence filter
wherein a subrange of U-NII-2B defines an unused frequency spectrum of the communication device between the subrange U-NII-2A and the subrange U-NII-2C such that the respective MIMO radios are configured for concurrently filtering signals in the U-NII-1/U-NII-2A spectrum and the U-NII-2C to U-NII-8 spectrum.

10. The communications device of claim 9, wherein
the U-NII-1 to U-NII-2A MIMO radio operates over a frequency range of 5.15 GHz to 5.34 GHz, and
U-NII-2C to U-NII-8 MIMO radio operates over a frequency range of 5.48 GHz to 7.125 GHz.

11. The communications device of claim 9, wherein each U-NII-1 to U-NII-2A coexistence filter has a pass-band from 5.15 GHz to 5.34 GHz, and a stop-band from 5.48 GHz to 7.125 GHz.

12. The communications device of claim 11, wherein an input-output transfer function of each U-NII-1 to U-NII-2A coexistence filter is greater than or equal to −3 dB over a frequency range of 5.15 GHz to 5.34 GHz, and less than or equal to −50 dB over a frequency range of 5.48 GHz to 7.125 GHz.

13. The communications device of claim 9, wherein each U-NII-2C to U-NII-8 coexistence filter has a pass-band from 5.48 GHz to 7.125 GHz, and a stop-band from 5.15 GHz to 5.34 GHz.

14. The communications device of claim 13, wherein an input-output transfer function of each U-NII-2C to U-NII-8 coexistence filter is greater than or equal to −3 dB over a frequency range of 5.48 GHz to 7.125 GHZ, and less than or equal to −50 dB over a frequency range of 5.15 GHz to 5.34 GHz.

15. The communications device of claim 9, wherein each U-NII-2C to U-NII-8 coexistence filter comprises a plurality of transversely-excited film bulk acoustic resonators (XBARs).

* * * * *